(12) United States Patent
Liu

(10) Patent No.: US 6,469,835 B1
(45) Date of Patent: Oct. 22, 2002

(54) OPTICAL COLLIMATOR WITH LONG WORKING DISTANCE

(75) Inventor: Zhimin Liu, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/704,113

(22) Filed: Oct. 30, 2000

Related U.S. Application Data

(60) Provisional application No. 60/162,025, filed on Oct. 28, 1999.

(51) Int. Cl.[7] ............................. G02B 27/30; G02B 6/32
(52) U.S. Cl. ........................... 359/641; 385/33; 385/34
(58) Field of Search ........................ 359/641; 385/33, 385/34, 11, 22, 31, 25, 88; 427/2.11

(56) References Cited

U.S. PATENT DOCUMENTS

| | | | | |
|---|---|---|---|---|
| 4,496,211 A | * | 1/1985 | Daniel | 385/31 |
| 5,039,193 A | * | 8/1991 | Snow et al. | 385/25 |
| 5,208,876 A | * | 5/1993 | Pan | 385/11 |
| 5,546,486 A | * | 8/1996 | Shih et al. | 385/31 |
| 5,818,981 A | * | 10/1998 | Pan et al. | 385/11 |
| 5,940,554 A | * | 8/1999 | Chang et al. | 385/22 |
| 5,949,929 A | * | 9/1999 | Hamm | 385/25 |
| 5,952,035 A | * | 9/1999 | Erb et al. | 427/2.11 |
| 6,012,854 A | * | 1/2000 | Kyoya | 385/88 |

* cited by examiner

Primary Examiner—Georgia Epps
Assistant Examiner—Gary O'Neill
(74) Attorney, Agent, or Firm—Fish & Richardson P.C.

(57) ABSTRACT

This invention discloses an optical collimator lens for collimating an incident light. The collimator lens includes an optical transmission rod substantially formed as an elongated cylinder. The optical transmission rod further includes a first end surface formed as a spherical or aspherical end surface and a second end surface opposite the first end-surface. The second end surface formed as an inclined planar surface having an incline angle θ relative to the optical axis of the optical transmission rod for increasing a return loss from the inclined planar surface. In a preferred embodiment, the inclined planar surface has an incline angle of substantially eight degrees or less or more.

13 Claims, 1 Drawing Sheet

OPTICAL COLLIMATOR WITH LONG WORKING DISTANCE

This Formal Application claims a Priority Date of Oct. 28,1999 benefited from a Provisional Application 60/162,025 filed on Oct. 28, 1999.

FIELD OF THE INVENTION

The present invention relates generally to a signal transmission system implemented with optical fibers and related optical components. More particularly, this invention relates to an optical collimator lens.

BACKGROUND OF THE INVENTION

Fiber optical collimator is the basic element commonly used for making different types of optical components and devices. A collimator lens is one of the major functioning parts for the collimator to transfer the divergent light from the optical fiber core into a collimated beam. Most of the collimators now available in the marketplace are implemented with a gradient index (GRIN) lens. The GRIN lens has an advantage that it can be conveniently placed in a tube. However, the coupling loss between a pair of collimators implemented with GRIN lenses increases quickly when the distance between the lens and the light source from the optical fiber increases. The coupling loss is 0.2 dB for a working distance less than 10 mm. The loss becomes greater than 0.5 dB for a distance of 100 mm and increased to 2 dB when the distance is increased to 140 mm. The reason of higher coupling loss with long distance is that the GRIN lens is typical designed for short distance application. Its complicated manufacturing process prevents it from flexible distribution of the gradient index profile. Additionally, the gradient index profile typically has distortion compared with curved surface of the conventional lens that increases the coupling loss in long working distance also. Some of the fiber optical devices have a long optical path and thus requiring a collimator with long working distance. However, with a long working distance, the coupling loss becomes a limitation when implemented with conventional collimator using the GRIN lens. The manufacturing of the GRIN lens involves toxic materials that causes higher cost and supply limitation.

Therefore, a need exits in the art of design and manufacture of fiber optical components and devices to provide new configurations and optical components for making an optical collimator that would be suitable for flexible working distance without being limited by great amount of coupling losses. Preferably, the new configuration and new optical component would be provided with low cost without requiring complicate manufacturing processes and safe materials. The conventional collimator lens is commercially available but that lens is not suitable for application in fiber optics mainly due to high reflection from the planar surface of the lens facing the light source on the fiber tips.

SUMMARY OF THE PRESENT INVENTION

It is therefore an object of the present invention to provide a new design and configuration for manufacturing a collimator lens by implementing the lens as a Rod Lens. The Rod Lens is provided with a special operational characteristic that it has a flexibly adjustable working distance and can be extended to a long working distance. With this new and improved collimator lens, the working distance limitation is resolved and the aforementioned difficulties and limitations in the prior art can be overcome.

Specifically, it is an object of the present invention to provide a new design and configuration for manufacturing a collimator lens by implementing a Rod Lens manufactured with a glass rod. The Rod Lens is formed with a first end-surface formed as spherical or aspherical end-surface and a second end surface formed as inclined-planar end-surface. Preferably, the incline angle of the inclined-planar end-surface relative to the main axis of the glass rod is substantially eight degrees or less. The Rod Lens as disclosed in this invention can be conveniently and economically manufactured. The Rod Lens also provides an advantage of high return loss. The return loss the power reflected back to optical fiber where the light signal comes out. When an optical collimator is assembled, the fiber tip is placed around the back focal point of the collimator lens. As the light comes out from the fiber and strikes on the back surface of the lens, a portion of light is reflected from that surface, some part of reflected light enters fiber and propagates along the fiber to interfere with signal source. The return loss is the critical parameters for a fiber optic component and devices. The Rod Lens is formed with diameter substantially in the range of the diameter of a regular GRIN lens such that the manufacture processes applied for handling the GRIN lens can also be applied for the Rod Lens. For smaller working distance, the coupling loss is similar to that of the GRIN lens. The coupling loss of the Rod Lens of this invention is much smaller than the GRIN lens for longer working distance. In addition to the advantage of flexibly longer working distance with smaller coupling loss, the Rod Lens of this invention can be produced with much lower cost than that of the conventional GRIN lens.

Briefly, in a preferred embodiment, the present invention includes a collimator lens for collimating an incident light beam. The collimating lens includes an optical transmission rod substantially formed as an elongated cylinder. The optical transmission rod further includes a first end surface formed as a spherical end surface and a second end surface opposite the first end-surface. The second end surface formed as an inclined planar surface having an incline angle relative to the optical axis of the optical transmission rod for increasing the return loss to the fiber from the inclined planar surface. In a preferred embodiment, the inclined planar surface has an incline angle of substantially eight degrees or more or less.

In summary, this invention discloses a collimator lens having a first optical surface for focusing an incident light beam to a point immediately near a second end surface, wherein said end surface is formed to have an increased return loss.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
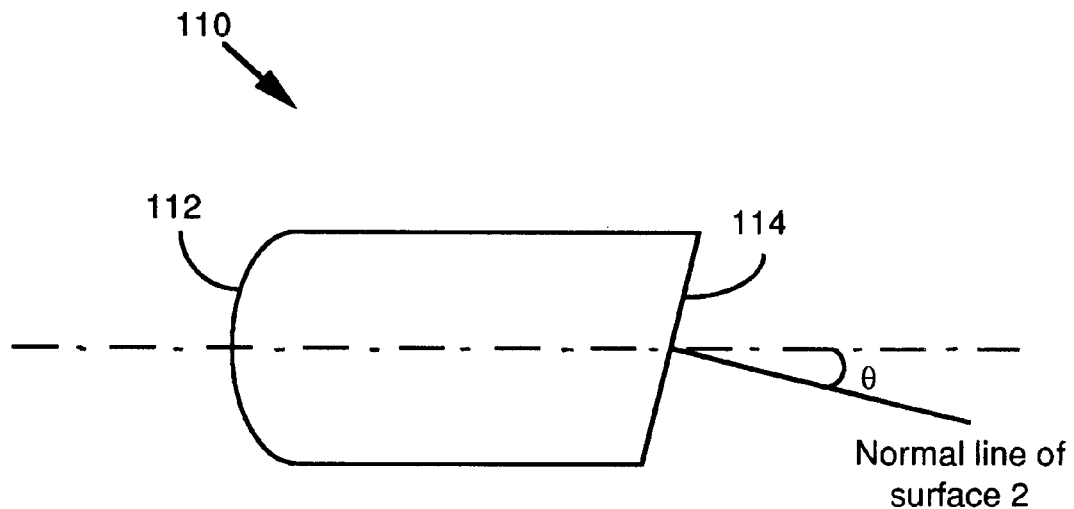
FIG. 1 is a cross sectional view of a glass rod of this invention.

Referring to FIG. 1 for a cross sectional view of a Rod Lens 110 that includes two optical surfaces. The first surface 112 is a spherical or aspherical surface and the second surface 114 is a planar surface. The second surface is an inclined planar surface with an incline angle θ against the axis of the Rod Lens 110 to increase the return loss. As the light reflected from the declined surface has doubled angle θ to enter back to fiber and vanishes quickly in short propagation distance in the fiber. The incline angle may be eight degrees or less or more. The Rod Lens 110 is designed to have as long as possible with the focal point located immediately near the second surface of the lens. The Rod Lens 110 as shown in FIG. 1 can be conveniently fabricated from a regular cylindrical glass rod.

Figure 2:
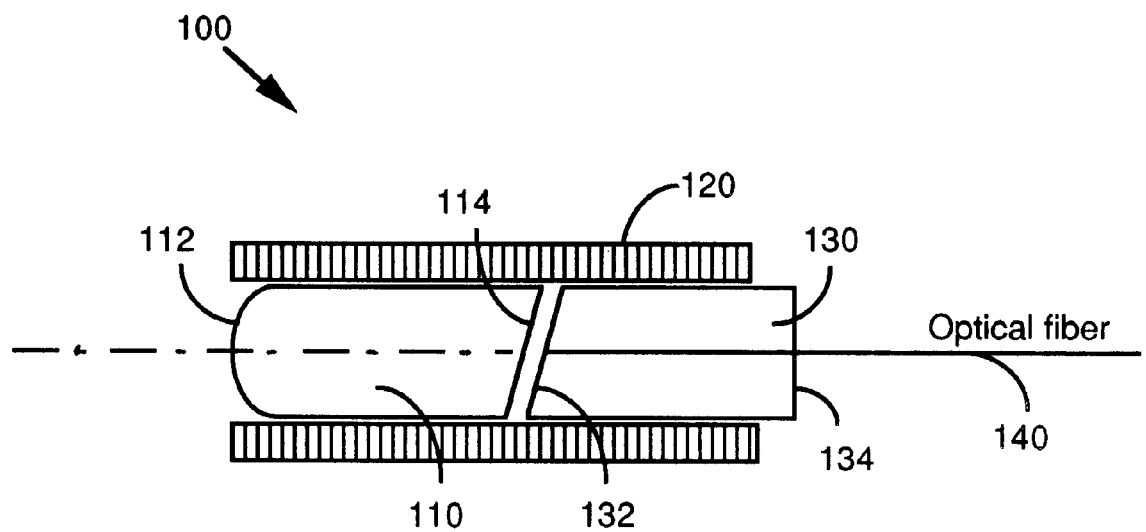
FIG. 2 is a cross sectional view of a collimator implemented with a rod lens of FIG. 1 disclosed by this invention.

FIG. 2 shows a novel optical collimator 100 that includes a Rod Lens 110 of FIG. 1. The Rod Lens is placed in a holding tube 120 with the first surface 112 of the Rod Lens 110 that is either a spherical or aspherical surface, facing the first opening end of the holding tube 120. The second surface 114 of the Rod Lens 110, which is an inclined planar surface, is placed in the middle of the holding tube 120. An optical fiber pigtail 130 holding an optical fiber 140 is placed next to the Rod Lens 110 with a front end inserted in the holding tube 120. The optical fiber pigtail 130 has a front surface 132 that has an incline angle substantially parallel to the second surface 114 of the Rod Lens 110. And, the optical fiber pigtail 130 has a rear surface 134 as shown in FIG. 2.

According to FIGS. 1 and 2, this invention discloses a collimator lens 110 for collimating an incident light. The collimator lens 110 includes an optical transmission rod substantially formed as an elongated cylinder. The optical transmission rod further includes a first end surface 112 formed as a spherical or aspherical end surface and a second end surface 114 opposite the first end-surface. The second end surface formed as an inclined planar surface having an incline angle θ relative to the optical axis of the optical transmission rod for increasing the return loss from the inclined planar surface. In a preferred embodiment, the inclined planar surface has an incline-angle of substantially eight degrees or less or more depending the orientation of the incline angle.

In essence, this invention discloses a collimating lens collimating divergent light from optical fiber. The lens includes first optical surface and a second optical surface. The second optical surface is formed to have an increased return loss. In a preferred embodiment, the collimator lens constituting an optical transmission rod having the first optical surface disposed on a first end and the second optical surface disposed on a second end. In another preferred embodiment, the first optical surface constituting a spherical end surface. In another preferred embodiment, the first optical surface constituting an aspherical end surface. In another preferred embodiment, the second end surface formed as an inclined planar surface having an incline angle relative to an optical axis of the collimating lens for increasing a return loss from the inclined planar surface. In another preferred embodiment, the optical transmission rod substantially constituting an elongated cylinder rod. In another preferred embodiment, the inclined planar surface having an incline angle of substantially eight degrees or less or more.

Therefore, a new design and configuration for manufacturing a collimator lens is disclosed. The new collimator lens implements the lens as a Rod Lens for fiber optic applications. The Rod Lens is provided with a flexibility in design and manufacturing for different working distance. With this specially designed collimator lens, the working distance limitation as encounter by the prior art is resolved. Specifically, the Rod Lens is manufactured with a glass rod. The Rod Lens is formed with a first end-surface formed as spherical or aspherical end-surface and a second end surface formed as inclined-planar end-surface. Preferably, the incline angle of the inclined-planar end-surface relative to the main axis of the glass rod is substantially eight degrees or less. The Rod Lens as disclosed in this invention can be conveniently and economically manufactured. The Rod Lens also provides an advantage of high return loss. The focal point of the spherical or aspherical end-surface is immediately near the second end-surface. The Rod Lens is formed with diameter substantially in the range of the diameter of a regular GRIN lens such that the manufacture processes applied for handling the GRIN lens can also be applied for the Rod Lens. For smaller working distance, the coupling loss is similar to that of the GRIN lens. The coupling loss of the Rod Lens of this invention is much smaller than the GRIN lens for longer working distance. In addition to the advantage of longer working distance with smaller coupling loss, the Rod Lens of this invention can be produced with much lower cost than that of the conventional GRIN lens.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A collimator lens comprising:
    an optical transmission rod;
    said optical transmission rod further including a first end surface formed as a spherical end surface and a second end surface opposite the first end-surface; and
    said second end surface formed as an inclined planar surface having an incline angle relative to an optical axis of said optical transmission rod for increasing a return loss from said inclined planar surface.

2. The collimating lens of claim 1 wherein:
    said optical transmission rod substantially constituting an elongated cylinder rod.

3. The collimating lens of claim 1 wherein:
    said inclined planar surface has an incline angle of substantially eight degrees.

4. A collimating lens comprising:
    a first optical surface and a second optical surface formed on an elongated optical transmission rod;
    wherein said first optical surface collimating an incident light received from a point immediately near said second optical surface.

5. The collimating lens of claim 4 wherein:
    said collimating lens constituting an optical transmission rod having said first optical surface disposed on a first end and said second optical surface disposed on a second end.

6. The collimating lens of claim 4 wherein:
    said first optical surface constituting a spherical end surface.

7. The collimating lens of claim 4 wherein:
    said first optical surface constituting an aspherical end surface.

8. The collimating lens of claim 4 wherein:
    said second end surface formed as an inclined planar surface having an incline angle relative to an optical axis of said collimating lens for increasing a return loss from said inclined planar surface.

9. The collimating lens of claim 4 wherein:

said elongated optical transmission rod substantially constituting an elongated cylinder rod.

10. The collimating lens of claim 8 wherein:

said inclined planar surface having a negative incline angle of substantially eight degrees.

11. The collimating lens of claim 1 wherein said first end surface is substantially transparent.

12. The collimating lens of claim 1 wherein said optical transmission rod is made from a single piece of solid material.

13. A method of making collimator lens comprising:

providing an elongated cylindrical rod made from a single piece of glass material, the cylindrical rod having a first end and a second end;

forming at the first end of the elongated cylindrical rod a first spherical surface; and forming at the second end of the elongated cylindrical rod an inclined planar surface having an incline angle relative to an axis of the elongated cylindrical rod.

* * * * *